(12) United States Patent
Hatada et al.

(10) Patent No.: US 6,986,502 B2
(45) Date of Patent: Jan. 17, 2006

(54) THROTTLE BODY

(75) Inventors: Naozumi Hatada, Yokohama (JP); Makoto Iida, Yokohama (JP); Yutaka Takeuchi, Hitachinaka (JP); Shigeo Tamaki, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 106 days.

(21) Appl. No.: 10/296,654

(22) PCT Filed: May 25, 2001

(86) PCT No.: PCT/JP01/04404

§ 371 (c)(1),
(2), (4) Date: Nov. 25, 2002

(87) PCT Pub. No.: WO01/90550

PCT Pub. Date: Nov. 29, 2001

(65) Prior Publication Data

US 2003/0106526 A1  Jun. 12, 2003

(30) Foreign Application Priority Data

May 25, 2000  (JP)  ............... 2000-159540
Apr. 4, 2001  (JP)  ............... 2001-105372

(51) Int. Cl.
*F02D 9/10*  (2006.01)
*F02M 35/10*  (2006.01)

(52) U.S. Cl. .................. 251/368; 251/305; 123/337

(58) Field of Classification Search ............... 251/305, 251/368; 123/337
See application file for complete search history.

(56) References Cited

U.S. PATENT DOCUMENTS

| 5,704,335 A | * | 1/1998 | Akutagawa et al. | ......... 123/337 |
| 6,065,483 A | * | 5/2000 | Tanaka et al. | ............... 251/366 |
| 6,451,238 B1 | * | 9/2002 | Suzuki et al. | ............... 264/250 |

FOREIGN PATENT DOCUMENTS

| JP | 07-166898 | * | 6/1995 |
| JP | 08-014069 | * | 1/1996 |
| JP | 09-032590 | * | 2/1997 |
| JP | 10-169473 | * | 6/1998 |

* cited by examiner

*Primary Examiner*—J. Casimer Jacyna
(74) *Attorney, Agent, or Firm*—Townsend and Townsend and Crew LLP

(57) ABSTRACT

A lightweight, low cost throttle body and throttle valve placed in the body, both formed of resins, that resolve the problem of excessively large gap formation is disclosed. Circumferentially oriented filler contained in a resin forming a throttle valve compensates to make the radial linear expansion coefficient of the throttle valve substantially equal to that of a bore. Grooves are formed on concentric circles in the throttle valve to orient filler circumferentially. A throttle valve provided with circumferentially oriented filler can be formed by impregnating an aggregate formed by circumferentially arranging the filler with a resin and curing the resin. A rib is formed in a part near a throttle shaft to control molding shrinkage so that the roundness of the bore is small.

5 Claims, 22 Drawing Sheets

FIG.22

($\times 10^{-6}/°C$)

| Cylindrical part | | Disk-shaped part | |
|---|---|---|---|
| Circumferential | Axial | Circumferential | Axial |
| 28.8 | 18.3 | 26.7 | 18.8 |

THROTTLE BODY

BACKGROUND OF THE INVENTION

This invention relates to a throttle valve made of resin used in a throttle body made of resin. Research and development activities have reduced the weight of automobiles to reduce fuel consumption. A conventional throttle body, one of the components of an intake system, is manufactured by aluminum die casting. Efforts have been made in recent years to provide lightweight, low-cost throttle bodies by forming throttle bodies of resins.

This invention relates to a throttle valve made of resin used in a throttle body made of resin. Research and development activities have reduced the weight of automobiles to reduce fuel consumption. A conventional throttle body, one of the components of an intake system, is manufactured by aluminum die casting. Efforts have been made in recent years to provide lightweight, low-cost throttle bodies by forming throttle bodies of resins.

The bore of a throttle body must be formed so that the gap between the bore wall defining the bore of the throttle body and a throttle valve placed in the bore of the throttle body is in the range of 80 to 100 $\mu$m. The bore of a conventional throttle body formed by die casting is finished by machining to form the bore to the desired accuracy. If a resin throttle body can be formed such that its bore is formed at an accuracy that insures the gap in the aforesaid range, machining is unnecessary. The roundness of the bore after molding shrinkage, the roundness of the throttle valve (hereinafter, roundness is used to represent variations in diameter), and errors in the inside diameter of the bore must be equal to those of an aluminum throttle valve formed by die casting. It is necessary to prevent the interference between the bore wall and the throttle valve, and an excessive increase in the gap between the throttle body and the throttle valve due to thermal deformation caused by the variation of temperature between a very low temperature and a high temperature exceeding 100° C.

A method of preventing irregular deformation proposed in JP-A No. 169473/1998 places a filler in an orientation in a bore part of a throttle body defining a bore. It is thought that the gap can be reduced when a metal throttle valve formed by machining is placed in such a bore part.

For cost reduction, the throttle valve must be formed of resin to omit a machining process. When both a throttle body having a bore and a throttle valve to be placed in the bore are formed of resins, the throttle body and the throttle valve can be formed of different resins having similar coefficients of expansion. Hence the initial gap between the bore wall and the throttle valve can be substantially maintained. When the throttle valve is formed of a resin having a thermal conductivity lower than those of metals, it is possible to prevent freezing that occurs in metal throttle valves during operation. Even if both the throttle body and the throttle valve are formed of the same resin containing the same amount of filler, the throttle body and the throttle valve will have different coefficients of linear expansion, and deform by different amounts due to the difference between the throttle body and the throttle valve in the orientation of the filler. Consequently, there is the possibility that the throttle valve will interfere with the bore wall, and thus the gap between the bore wall and the throttle valve increases.

Recent internal combustion engine design has tended to reduce the idle throttle valve opening to reduce idle speed. When the idle throttle valve opening is reduced, the possibility increases that contaminants, such as carbon contained in the recirculated exhaust gas, and oils contained in the blowby gas, will adhere to the periphery of the throttle valve. If those contaminants deposited on the throttle valve are solidified by the heat of the internal combustion engine, the throttle valve locks to the bore wall and, in the worst case, the throttle valve will not move even if the accelerator pedal is operated.

BRIEF SUMMARY OF THE INVENTION

This invention provides a throttle body such that the thermal deformation of the bore wall of the throttle body is substantially equal to that of a throttle valve at temperatures in the range of a very low temperature to a temperature exceeding 100° C. The gap between the bore wall and the throttle valve is the same as the gap between the bore wall of a conventional throttle body and a conventional throttle valve, and provides a low-cost, high-performance throttle body. The invention also reduces the roundness of a bore after molding shrinkage and reduces the gap between a throttle valve and the bore. In addition, it prevents the fixation of the throttle valve as sometimes caused by solid deposits such as carbon and oils.

To solve the foregoing problems, according to the present invention, a filler contained in a resin is oriented in a circumferential direction to make the linear expansion coefficient of a throttle valve in a radial direction approach that of a bore. This makes the thermal deformation of the throttle valve approach that of the bore to prevent the aforesaid interference and the enlargement of the gap.

To solve the foregoing problems, a throttle body according to an embodiment of the present invention includes a throttle shaft extended substantially diametrically across an intake cylinder (bore); and a throttle valve fixed to the throttle shaft and contained in the bore, wherein the bore and the throttle valve are made of a resin containing filler, and the difference between circumferential deformation of the bore and radial deformation of the throttle valve is in the range of 0 to 40 $\mu$m at temperatures in the range of −40° C. to 120° C. In addition, a throttle body according an embodiment of the present invention includes an intake cylinder (bore); and a throttle valve, wherein the throttle valve and the bore are formed of resins containing filler, the difference between the linear expansion coefficient of the throttle valve and that of the bore being in the range of 0 to 4×10⁻⁶/° C.

Preferably, in the throttle body according to an embodiment of the present invention, the fillers in the bore and the throttle valve are oriented in substantially the same direction, or are randomly oriented in the bore and the throttle valve. In addition, in some embodiments, the throttle valve is provided with circumferential grooves or ribs, and the filler is substantially circumferentially oriented.

To form the throttle body, the throttle valve is made by sandwiching an aggregate formed by circumferentially arranging the filler between resin layers. Preferably, the throttle valve is made of a resin different in filler content from that forming the bore to make the radial thermal expansion coefficient of the throttle valve nearly equal to the circumferential linear expansion coefficient of the bore. Furthermore, in the throttle body according to the present invention, at least a peripheral part of the throttle valve facing the bore wall of the bore is made of a resin containing a fluorocarbon resin or is coated with a fluorocarbon resin.

A preferred embodiment of the throttle body according to the present invention includes a throttle shaft extended substantially diametrically across an intake cylinder (bore); and a throttle valve fixed to the throttle shaft and contained in the bore; wherein the bore is made of a resin, and an annular rib of a fixed or continuously changing width, or parts of such an annular rib, are formed in a part corresponding to the throttle shaft of the bore to counterbalance the effect of sinks due to bosses. Typically in the throttle body the minimum thickness is ⅔ of maximum thickness or below.

To solve the foregoing problems, in the throttle body according to the present invention, ribs are formed in parts of the bore around the throttle shaft such that the product of maximum height and thickness is in the range of 15 to 40% of the heights and the mean thickness of the bosses and the product of minimum height and thickness is in the range of 20 to 80% of the product of maximum height and thickness. The bore is provided in a part thereof with a rib capable of limiting the roundness (diameter) of a part of the bore in the range of ±5 mm along the center axis of the bore from a position corresponding to the throttle shaft to 80 μm or below. The ribs are formed in the parts of the intake cylinder defining the bore around the throttle shaft to reduce the roundness of the bore after mold shrinkage. The present invention also often adds an additive to the resin to suppress the adhesion of carbon and oils to the throttle valve.

BRIEF DESCRIPTION OF THE DRAWINGS

FIG. 22 is a table showing measured coefficients of linear expansion.

DETAILED DESCRIPTION OF THE INVENTION

Figure 2:
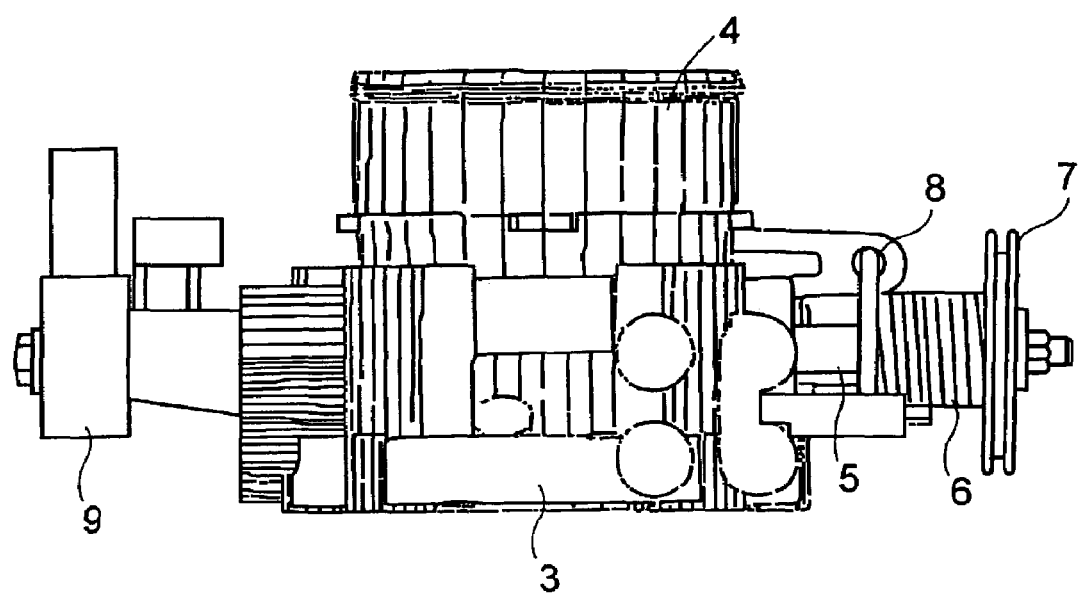
FIG. 2 is a side elevation of a throttle body.
Figure 3:
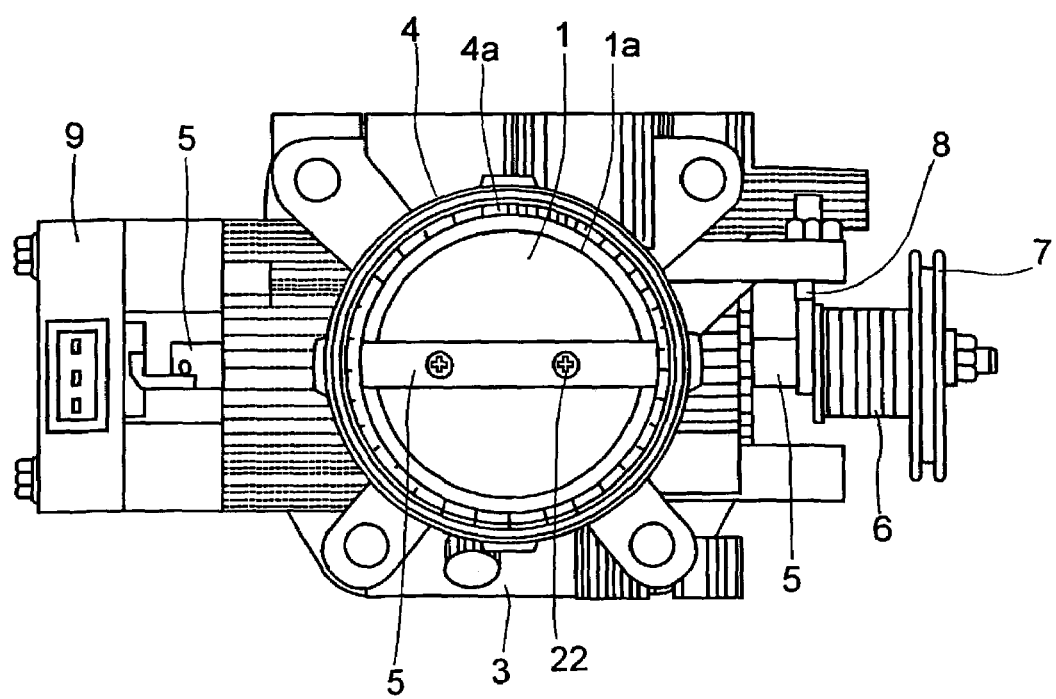
FIG. 3 is a plan view of the throttle body.

Preferred embodiments of the present invention will be described hereinafter with reference to the accompanying drawings. Referring to FIGS. 2 and 3, a throttle body 3 has a throttle valve 1 contained in a space surrounded by a bore wall 4a of a bore 4, and a throttle shaft 5. The throttle valve 1 is fastened to the throttle shaft 5 with screws 22. Throttle shaft 5 is extended substantially diametrically across bore 4. A throttle lever 7 is connected to one end of the throttle shaft 5. A return spring 6 is extended between throttle lever 7 and a stopper 8. A throttle-valve position sensor 9 is attached to the other end of throttle shaft 5.

When the driver depresses an accelerator pedal, not shown, throttle lever 7 is moved and throttle shaft 5 is moved accordingly to open throttle valve 1. When the force applied to the accelerator pedal is removed, throttle valve 1 is closed by the resilience of return spring 6. In a state where throttle valve 1 is closed, the gap between circumference 1a of throttle valve 1 and bore wall 4a is, for example, in the range of 80 to 100 μm to reduce idle speed, fuel consumption and noise during idling. This gap enables the smooth movement of throttle valve 1. In FIG. 3, the gap is exaggerated to facilitate understanding.

When throttle body 3 is heated by the heat generated by the engine, part of the gap between circumference 1a of the throttle valve and bore wall 4a decreases, and the throttle valve 1 bites into the bore wall. This phenomenon is liable to occur mostly during idling.

Figure 4:
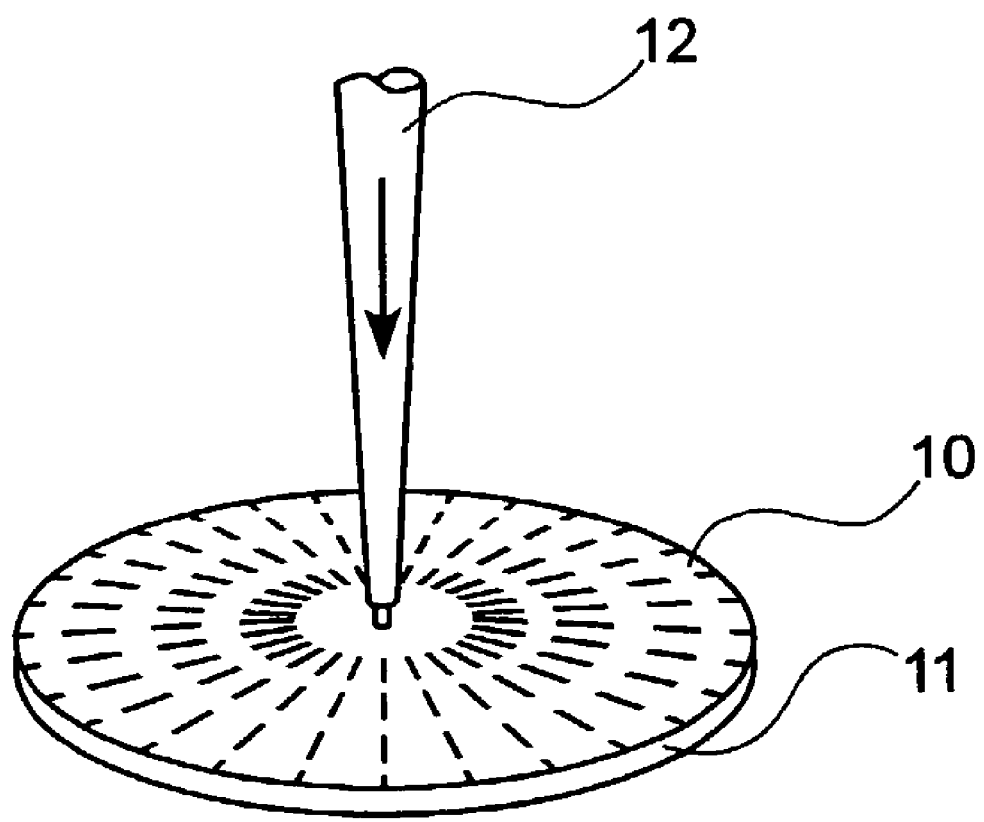
FIG. 4 is a schematic view to assist in explaining a method of molding a disk-shaped part.
Figure 5:
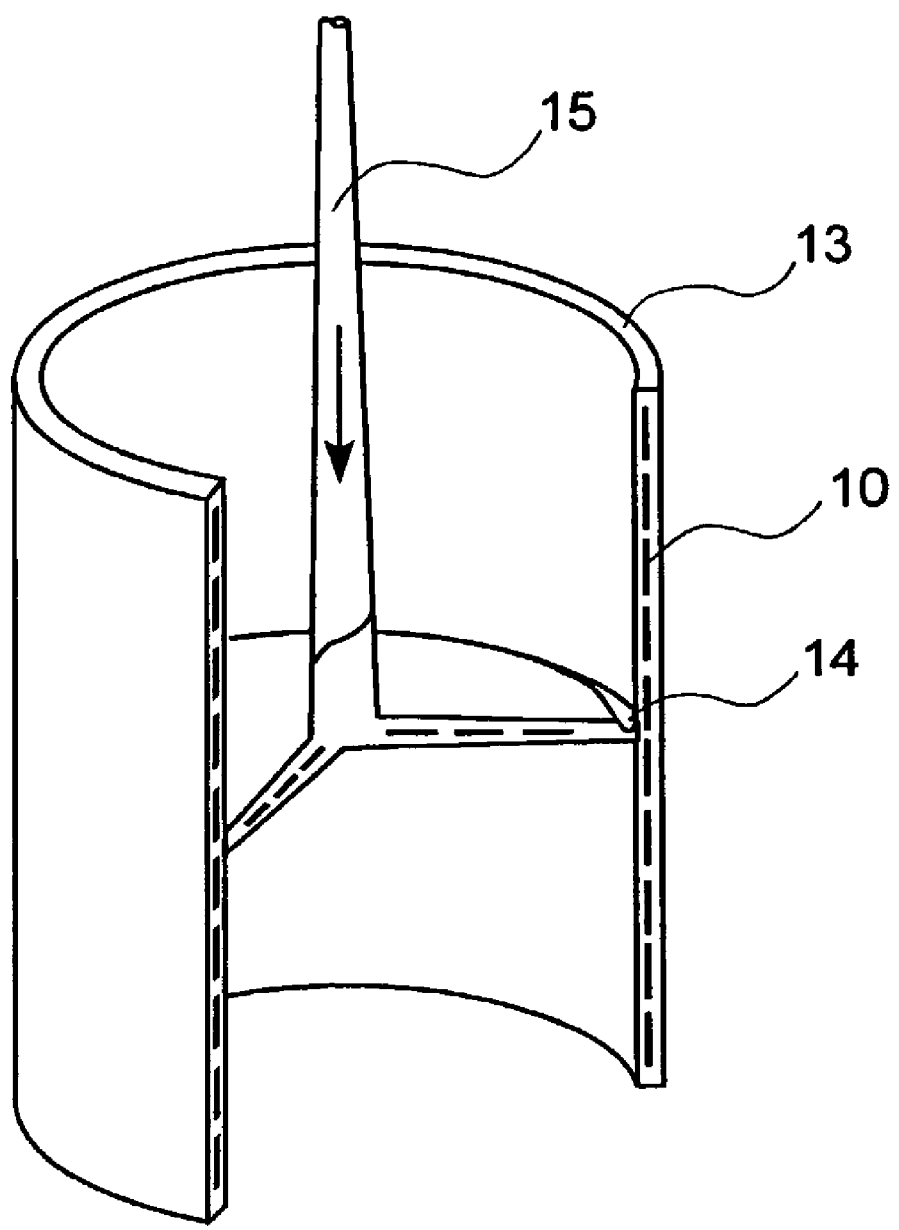
FIG. 5 is a schematic view to assist in explaining a method of molding a cylindrical part.

The linear expansion coefficient of a resin containing a fibrous filler in a direction parallel to the extending direction of the filler is small, and that of the same in a direction perpendicular to the extending direction of the filler is large. FIG. 4 is a schematic view of assistance in explaining a method of molding a common disk, in which a filler is indicated at 10, a disk is indicated at 11 and a runner is indicated at 12. A resin flows through runner 12 to a position corresponding to the center of disk-shaped part 11. As shown in FIG. 4, filler 10 is oriented radially from the center when the thickness of disk-shaped part 11 is small. Filler 10 is enlarged in FIG. 4 to facilitate recognizing the direction of orientation. Therefore, it is expected that radial thermal deformation is smaller than circumferential thermal deformation. FIG. 5 is a schematic view of assistance in explaining a method of molding a cylindrical part. Gates symmetrical with respect to a circumferential direction are formed to improve roundness. Shown in FIG. 5 are a cylindrical part 13, a gate 14 and a runner b 15. In this case, filler 10 extends in a flowing direction and is generally axially oriented. It is expected that circumferential and radial coefficients of thermal deformation are large, an axial thermal deformation is small. FIG. 22 shows measured coefficients of linear expansion of a cylindrical part and a disk-shaped part made of a resin containing filler 10.

The circumferential linear expansion coefficient of the cylindrical part is 1.6 times the axial linear expansion coefficient of the same, and the circumferential linear expansion coefficient of the disk-shaped part is 1.4 times the radial linear expansion coefficient of the same, which substantiates the aforesaid expectation. Suppose that the cylindrical part is a bore, and the disk-shaped part is a throttle valve. Then, the circumferential linear expansion coefficient of the cylindrical part, and the radial linear expansion coefficient of the disk-shaped part are related with the gap. There is a large difference between the circumferential linear expansion coefficient of the cylindrical part of $28.8 \times 10^{-6}/°$ C. and the radial linear expansion coefficient of the disk-shaped part of $18.8 \times 10^{-6}/°$ C. When the inside diameter is 60 mm, a difference between sizes in the working temperature range of $-40$ to $120°$ C. is 96 $\mu$m. Thus, it is important to make the coefficients of linear expansion the same in both parts. In this case, the difference between the respective deformations of the bore and the throttle vale must be smaller than 80 $\mu$m. The deformation difference of 80 $\mu$m corresponds to a difference of about $8 \times 10^{-6}/°$ C. in linear expansion coefficient when the inside diameter is 60 mm and the working temperature range is $-40$ to $120°$ C. Thus, to prevent galling of the bore and throttle valve, the difference between the respective coefficients of linear expansion of both parts must not be greater than about $8 \times 10^{-6}/°$ C. More preferably, in view of changes in roundness, it is desirable that the deformation difference is 40 $\mu$m or below.

In this embodiment, a method of increasing the radial linear expansion coefficient of throttle valve 1, which is easier to deal with than the throttle body 3, has been devised. Preferred embodiments of the present invention will be described with reference to the accompanying drawings.

First Embodiment

Figure 1:
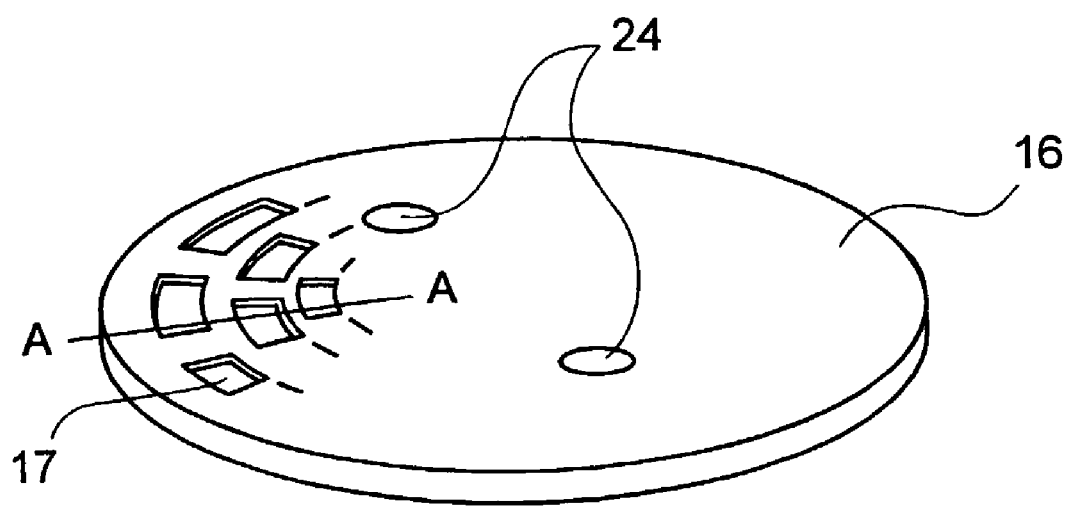
FIG. 1 is a perspective view of a throttle valve in a first embodiment according to the present invention.
Figure 6:
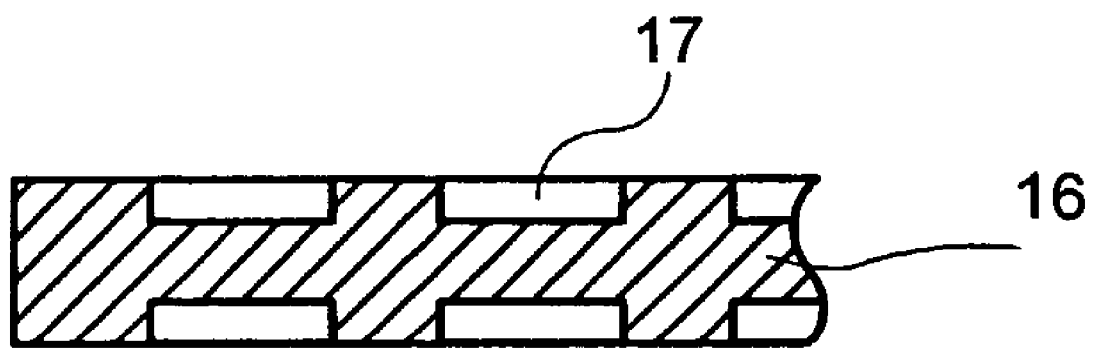
FIG. 6 is a sectional view taken on line A—A in FIG. 1.

FIG. 1 is a typical view of a throttle valve 1 in a first embodiment according to the present invention. Shown in FIG. 1 are a throttle valve 16, some of grooves 17 arranged on concentric circles, and holes 24 for attaching throttle valve 16 to a shaft 5. FIG. 6 is a sectional view taken on line A—A in FIG. 1. A filler may also be added, and oriented.

Filler 2 can be oriented mostly in a circumferential direction by arranging grooves 17 on concentric circles. Grooves 17 are in a zigzag arrangement in this embodiment to make a resin flow through thin parts of each groove without fail. Thus, the radial flow of the resin is disturbed to make the extension of the filler in radial directions difficult, and the probability of the filler extending in a circumferential direction increase.

The filler can be more randomly oriented by changing the depth, size and pitches of grooves 17. When the filler is oriented mostly in a circumferential direction, it is desirable that the linear expansion coefficient of throttle valve 1 is close to that of bore 4.

The difference in the linear expansion coefficient between throttle valve 1 and bore 4 can be made smaller than that when the filler is radially oriented in the throttle valve by randomly orienting the filler, which is within the scope of the present invention.

Consequently, as mentioned above, the radial linear expansion coefficient of the throttle valve can be made to approach that of bore 4 to suppress the variation of the gap between throttle valve 16 and bore 4 according to temperature variation. Throttle valve 16 in this embodiment can be easily made by injecting a thermoplastic resin into a cavity of a mold provided with protrusions corresponding to the grooves.

Figure 7:
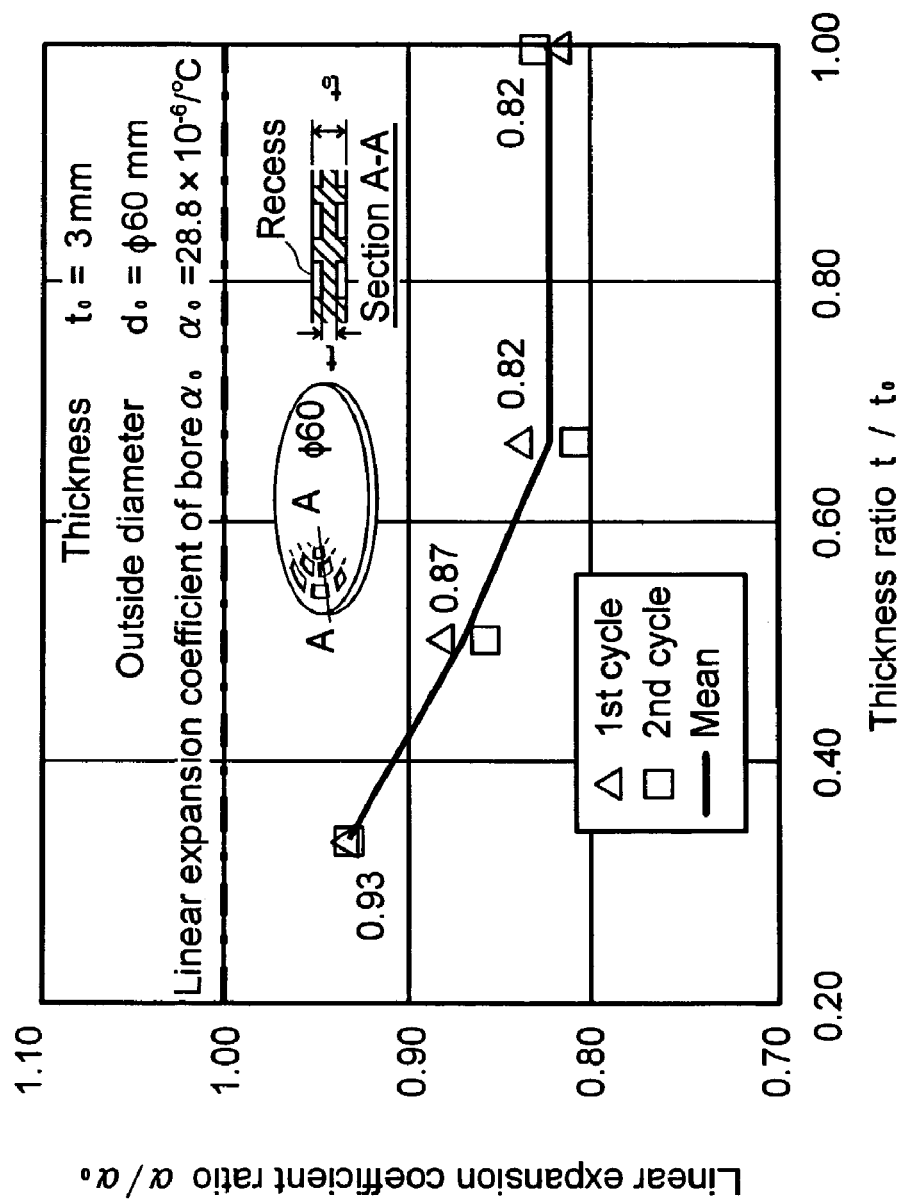
FIG. 7 is a graph showing the relation between the depth of grooves and linear expansion coefficient in the throttle valve according to the first embodiment.

FIG. 7 shows the coefficients $\alpha$ of linear expansion of four types of disk-shaped parts of a thickness of $t_0=3$ mm and an outside diameter of 60 mm, respectively provided with grooves of depths of 0.5 mm, 0.75 mm. and 1.0 mm, Minimum thicknesses t of the disk-shaped parts, which are associated with these depths of the grooves, are 2.0 mm, 1.5 mm, and 1.0 mm, respectively. The thickness ratio $t/t_0$ is measured on the horizontal axis, and the linear expansion coefficient ratio $\alpha/\alpha_0$, i.e., the ratio of the linear expansion coefficient $\alpha$ of the throttle valve to the linear expansion coefficient $\alpha_0$ of the bore, is measured on the vertical axis. The effect of the grooves is significant and the linear expansion coefficient ratio $\alpha/\alpha_0$ approaches 1 when the thickness ratio $t/t_0$ is smaller than $\frac{2}{3}$; that is, the respective linear expansion coefficients of the disk-shaped part and the bore approach each other.

Figure 8:
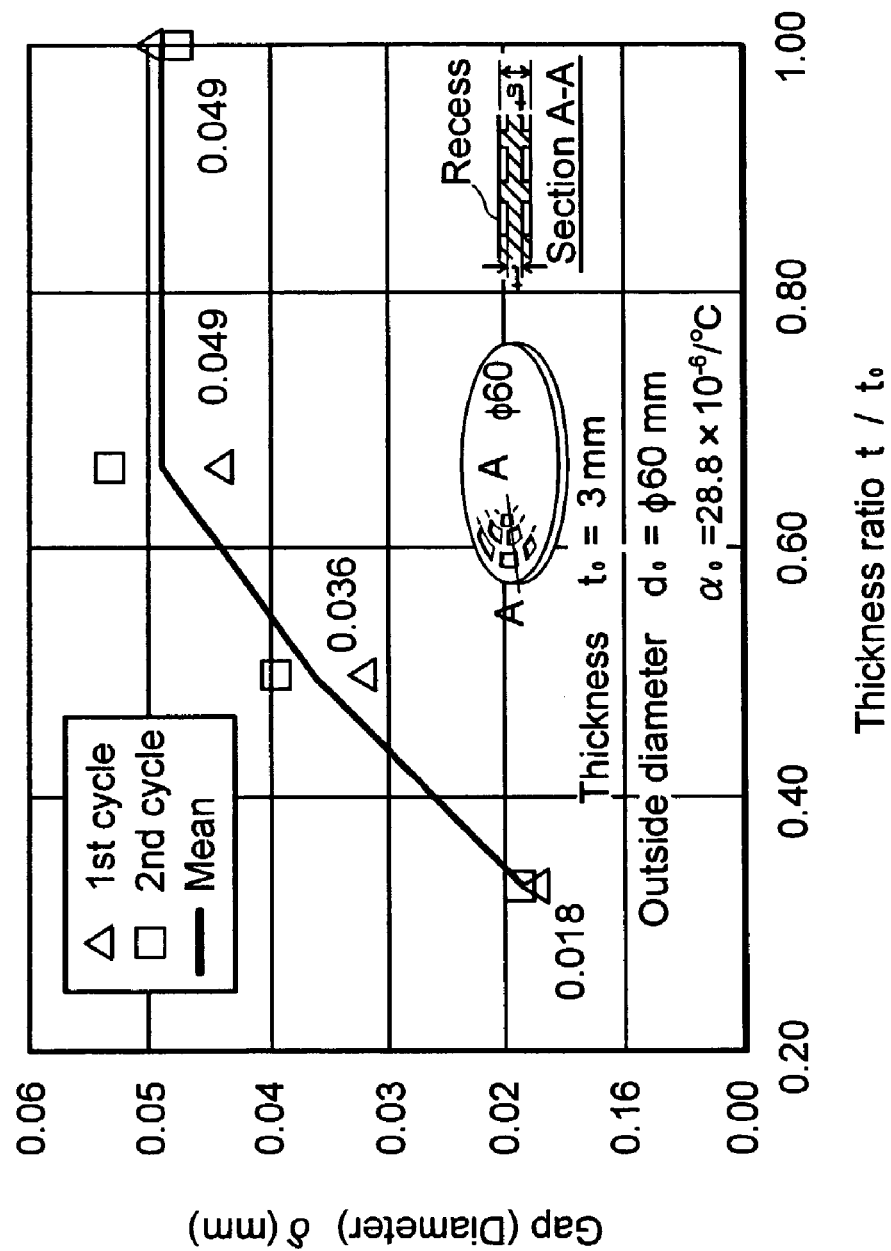
FIG. 8 is a graph showing the relation between the depth of a groove and gap in the throttle valve in the first embodiment.

FIG. 8 shows calculated gap information between the disk-shaped part and the bore in the temperature range of $-40$ to $120°$ C. The gap is 49 $\mu$m when the disk-shaped part is not provided with any grooves. The gap is as small as 18 $\mu$m when the disk-shaped part is provided with grooves of 1 mm in depth. In this embodiment, the gap can be limited to 40 $\mu$m or below (0 to 40 $\mu$m) when the temperature of the disk-shaped part is in the temperature range of $-40$ to $120°$ C. by forming grooves in the disk-shaped part such that the minimum thickness is $\frac{1}{2}$ of the original thickness or below. This corresponds to a linear expansion coefficient difference of about $4 \times 10^{-6}/°$ C. (0 to $4 \times 10^{-6}/°$ C.) when the inside diameter is 60 mm.

The linear expansion coefficient $\alpha$ of $23.7 \times 10^{-6}/°$ C. of the disk-shaped part in this embodiment is greater than the linear expansion coefficient of $18.1 \times 10^{-6}/°$ C. of a disk-shaped part shown in FIG. 22 and is near the linear expansion coefficient of $28.8 \times 10^{-6}/°$ C. of the bore. It is inferred that this is the result of the increase of a part not subject to the influence of shearing with a wall surface resulting from an increased thickness in the range of 1.5 to 3.0 mm and increased ratio of circumferentially oriented fibers.

Referring again to FIG. 1, to prevent galling of the throttle valve and bore 4, practical throttle valve 16 is in contact with bore 4 in a position inclined at several degrees to the axis of the bore and not perpendicular to the axis of the bore. Therefore, practical throttle valve 16 is not a perfectly circular disk, but an elliptic plate that is tapered. The mold is made to conform to the shape of throttle valve 16.

Although grooves 17 are formed in the opposite surfaces, grooves 17 may be formed in only one of the opposite surfaces for the same effect. However, when grooves 17 are formed in only one of the opposite surfaces, measures to prevent the warp of the throttle valve, such as heating different parts of the mold at different temperatures, respectively, must be taken. Although grooves 17 are in a zigzag arrangement in this embodiment, the grooves may be radially arranged. The throttle valve may be provided with concentric circular grooves. Grooves 17 may be formed only in a peripheral part for the same effect.

Throttle valve 1 is bent around the throttle shaft by a negative pressure during idling. As mentioned above, since throttle valve 11 is not perpendicular to the axis of the bore and is inclined at an angle to the axis of the bore, the half of the throttle valve closer to the engine is bent so as to recede from the bore wall. The other half of the throttle valve farther from the engine is bent to come into the bore wall. Consequently, the throttle valve and the bore gall, and there is the possibility, in the worst case, that the throttle valve will become uncontrollable.

Figure 9:
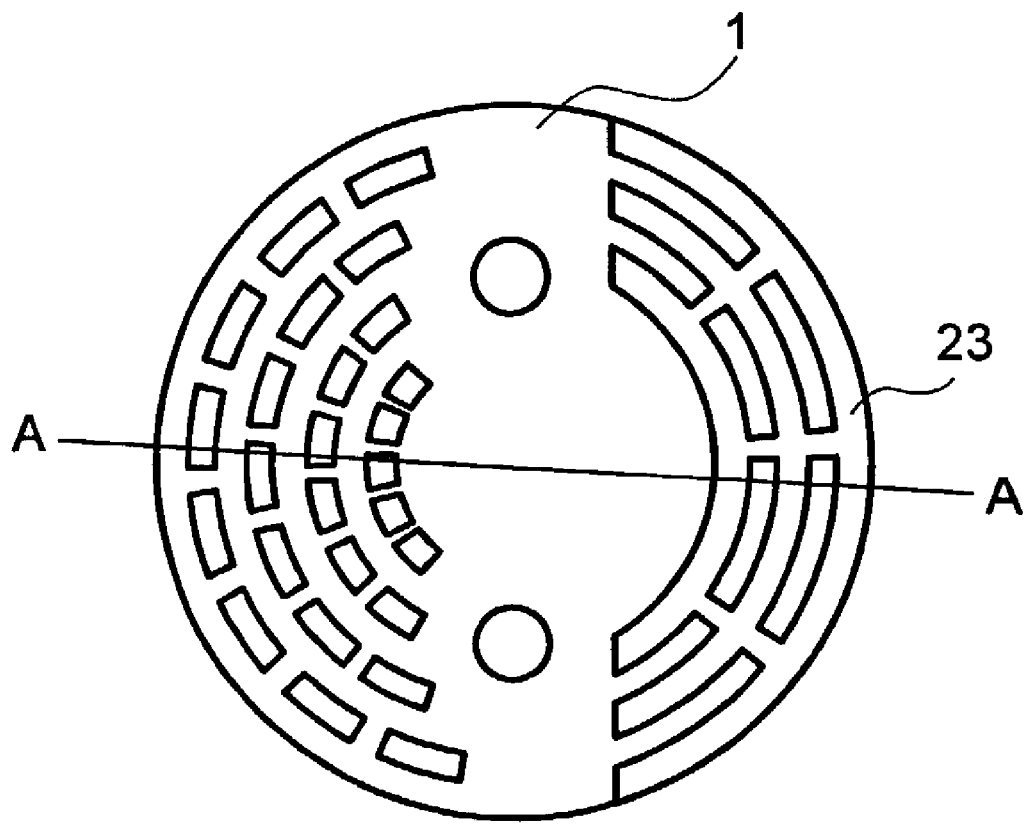
FIG. 9 is a schematic diagram showing a throttle valve in a modification of the first embodiment.
Figure 10:
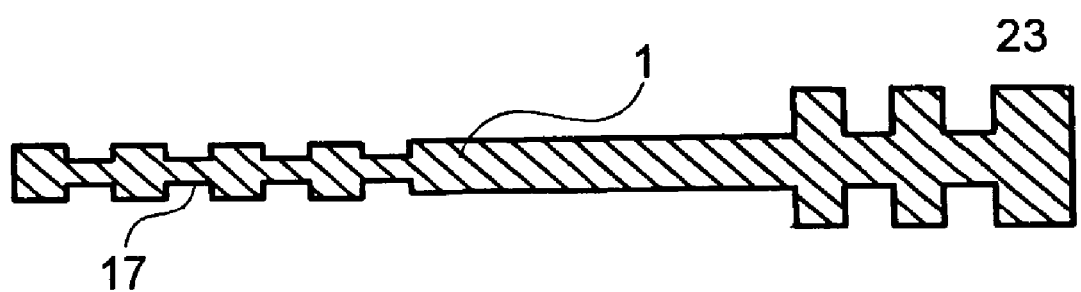
FIG. 10 is a sectional view of another throttle valve according to the first embodiment, taken on line A—A in FIG. 9.

As shown in FIG. 9, ribs are formed on the half of the throttle valve farther from the engine (right half in FIG. 9) instead of the grooves so that the filler is circumferentially oriented. FIG. 10 shows grooves 17 and ribs 23. Thus, the reduction of the thickness due to the formation of the grooves is avoided and the rigidity of this half is increased. FIG. 10 is a sectional view taken on line A—A of FIG. 9. Most of filler 10 is circumferentially oriented in the half of the throttle valve provided with ribs 23 shown in FIG. 10. Therefore, the linear expansion coefficient of throttle valve 1 can be made near or substantially equal to that of the bore. Consequently, the strength of throttle valve 1 can be increased and, at the same time, the difference in the linear expansion coefficient between the throttle valve and the bore can be reduced to a value not greater than the predetermined value, which can solve the problem with galling of throttle valve 1 and bore 4.

Figure 21:
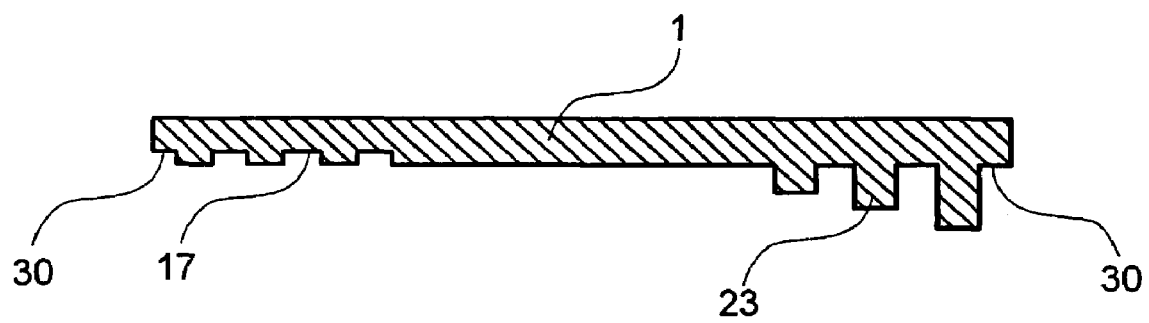
FIG. 21 is another example of a section on line A—A in FIG. 9.

The ribs may be formed on either one or both of the opposite surfaces. If the ribs are formed on only one of the surfaces, flow resistance can be reduced by forming protrusions on the side of the engine. FIG. 21 shows another section of a throttle valve corresponding to the section taken on line A—A of FIG. 9. FIG. 21 shows grooves 17 and ribs 23. The ribs are formed in the right half of the throttle valve such that the height of the rib nearer to the circumference is greater than that of the rib farther from the circumference to enhance the bending rigidity of the rib. The adhesion of carbon and oils to a peripheral part 30 can be avoided without forming any ribs in peripheral part 30.

Possible filler materials for the resin used in this embodiment are, for example, glass fibers, carbon fibers, boron fibers, aramid fibers, carbon silicate fibers, alumina fibers and potassium titanate ($K_nO \cdot nTiO_2$) whiskers.

Figure 11:
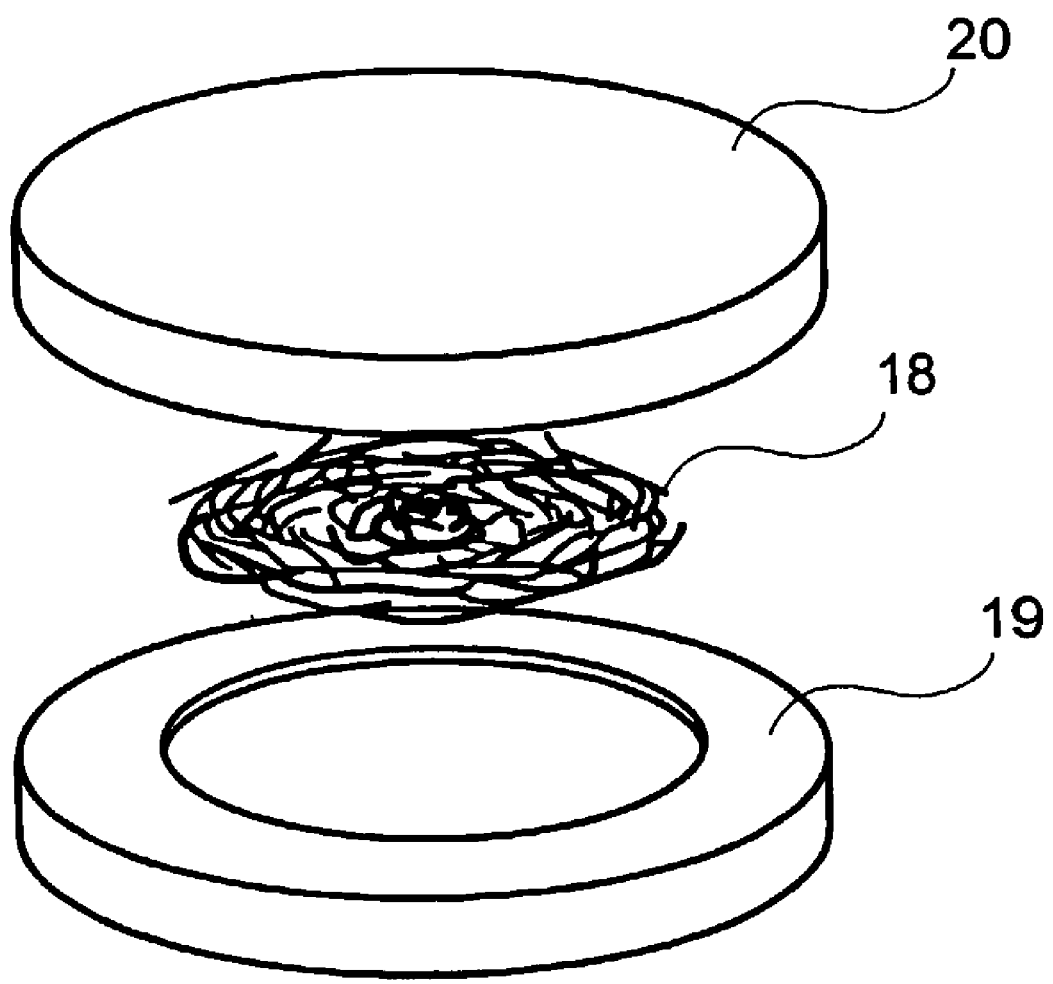
FIG. 11 is a typical view of a throttle valve in a second embodiment according to the present invention.
Figure 12:
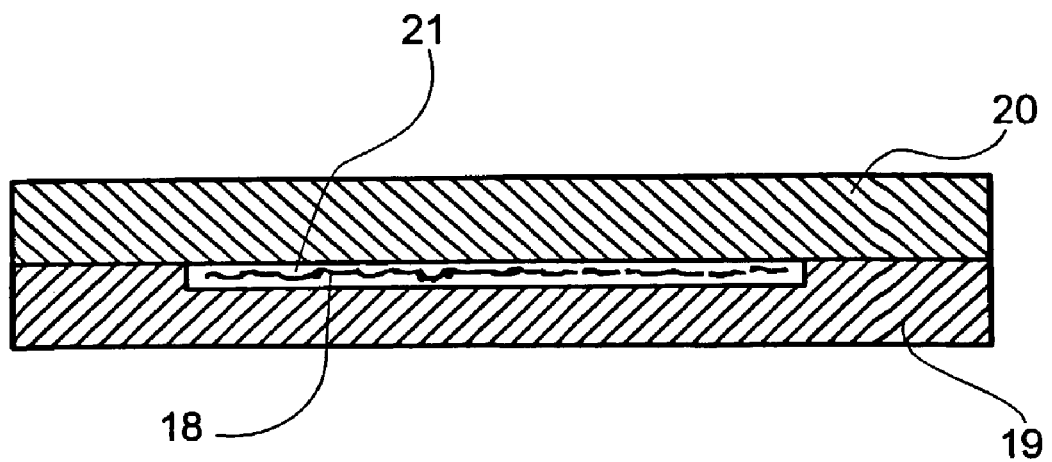
FIG. 12 is a sectional view of a mold for molding the throttle valve in the second embodiment.

Second Embodiment:

FIG. 11 is a typical view of throttle valve 1 to assist in explaining a method of manufacture in a second embodiment according to the present invention. FIG. 12 is a sectional view of a mold used in manufacturing throttle valve 1. There are shown an aggregate 18 formed by circumferentially arranging filler 18, a lower mold 19, and an upper mold 20. The aggregate of filler is placed in a recess formed in lower mold 19, and a thermosetting resin is poured in the recess to impregnate the filler with the thermosetting resin. The lower mold 19 and upper mold 20 are joined together, and the mold is heated to set the thermosetting resin. In throttle valve 1 in the second embodiment, the filler is arranged circumferentially. The linear expansion coefficient of the second embodiment, like that of the first embodiment, can be made to approach the linear expansion coefficient of bore 4, so that it is possible to prevent the variation of the gap between throttle valve 1 and bore 4 according to the variation of temperature.

Although the aggregate of filler is used in the second embodiment, a filling member formed by arranging strings of filler 2 in concentric circles or in a spiral may be used. Even a filling member like a fabric formed by weaving threads of filler is somewhat effective. A throttle valve 1 having the same properties can be manufactured by using a cold-setting resin, a photocurable resin or a thermoplastic resin instead of the thermosetting resin. If a photocurable resin is used, upper mold 20 must be a glass mold.

Third Embodiment:

The radial linear expansion coefficient of a throttle valve 1 can be made to approach the circumferential linear expansion coefficient of a bore 4 by another method that forms throttle valve 1 with a resin having a filler content different from that of a resin forming bore 4. Generally, the linear expansion coefficient of a resin having a small filler content is large. The linear expansion coefficient of throttle valve 1 in this embodiment can be made to approach the circumferential linear expansion coefficient of bore 4 by forming throttle valve 1 of a resin having a small filler content. Consequently, the variation of the gap between throttle valve 1 and bore 4 according to the variation of temperature can be suppressed.

The radial linear expansion coefficient of the throttle valve can be made to approach the circumferential linear expansion coefficient of the bore by forming the throttle valve and the bore of different resins, respectively.

Figure 13:
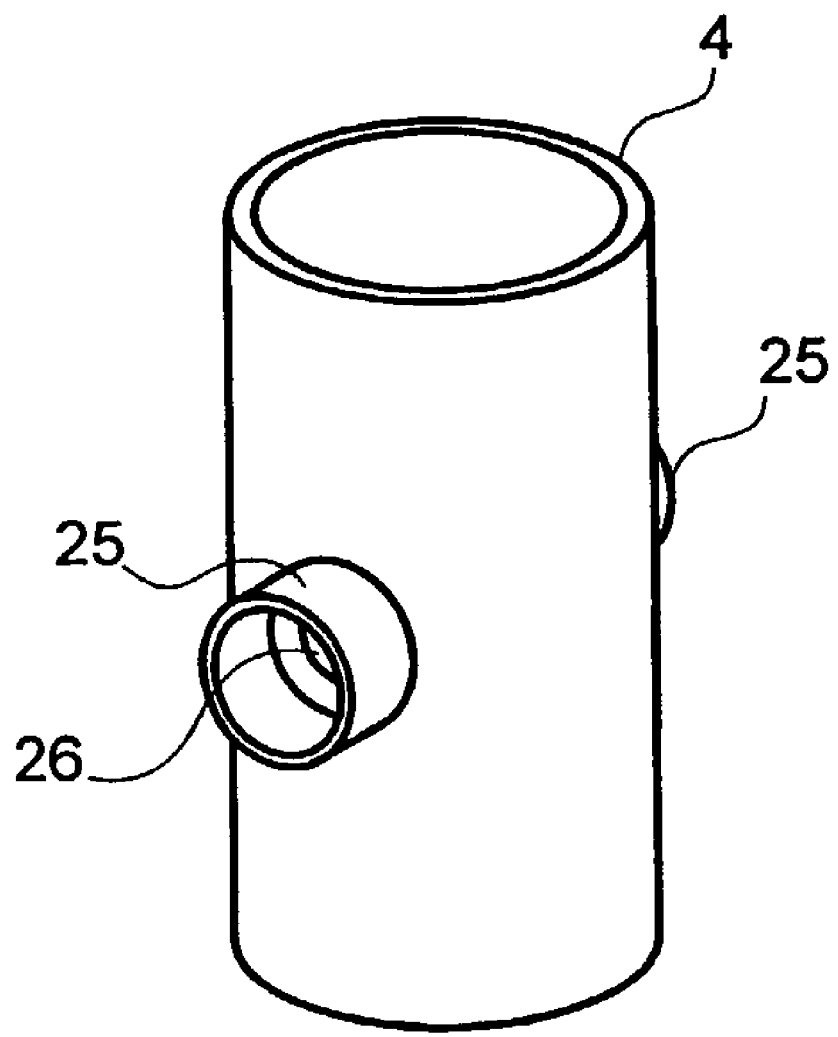
FIG. 13 is a perspective view of an analytic model of a throttle body.

Fourth Embodiment:

FIG. 13 shows perspective view of an analytic model to assist in explaining the postmolding shrinkage that occurs after injection molding of a throttle body in a fourth embodiment according to the present invention. A bore 4, bearing housings 25 for housing bearings supporting a throttle shaft, and through holes 26 through which the throttle shaft is extended are shown. The bore is 50 mm in diameter and 100 mm in height; the housing is 20 mm in diameter and 10 mm in height; the through holes are 10 mm in diameter, and the bore has a wall thickness of 2 mm.

Flow, holding and warp during injection molding were analyzed using this model and general-purpose resin flow analyzing software (MOLDFLOW). A PEI (polyetherimide) containing 25% glass fibers and 20% mica as filler (ULTEM 3452 made by GE Plastics) was used.

Figure 14:
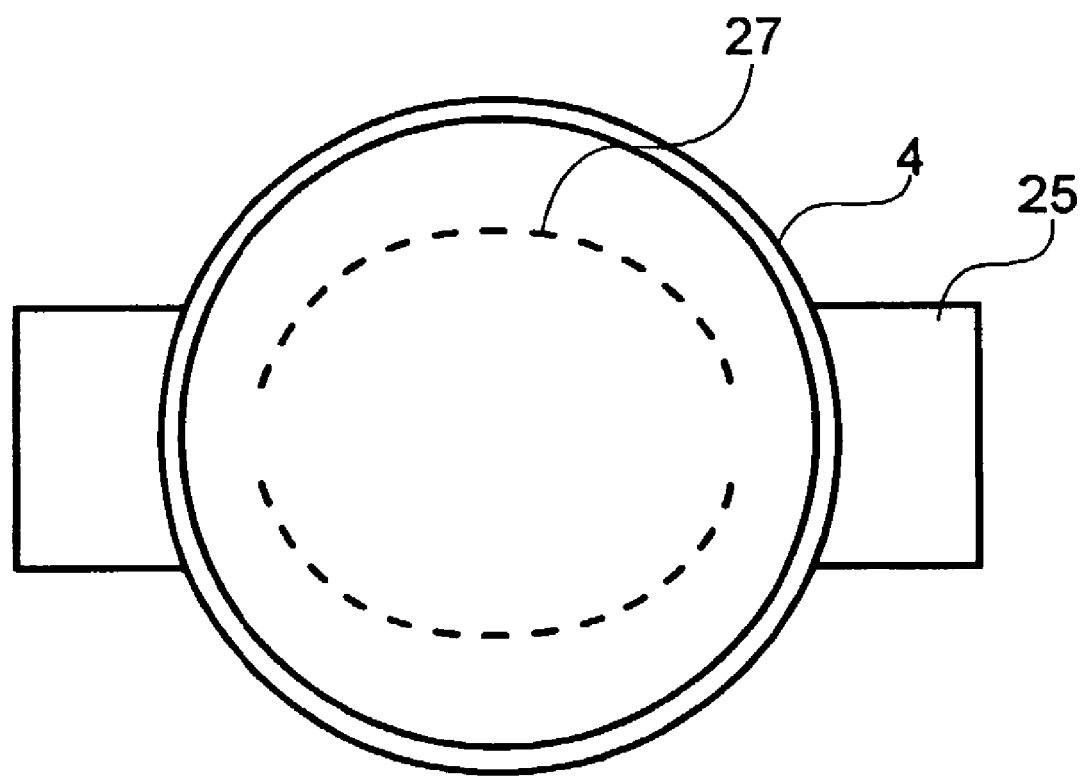
FIG. 14 is a top view of the analytic model shown in FIG. 13.
Figure 15:
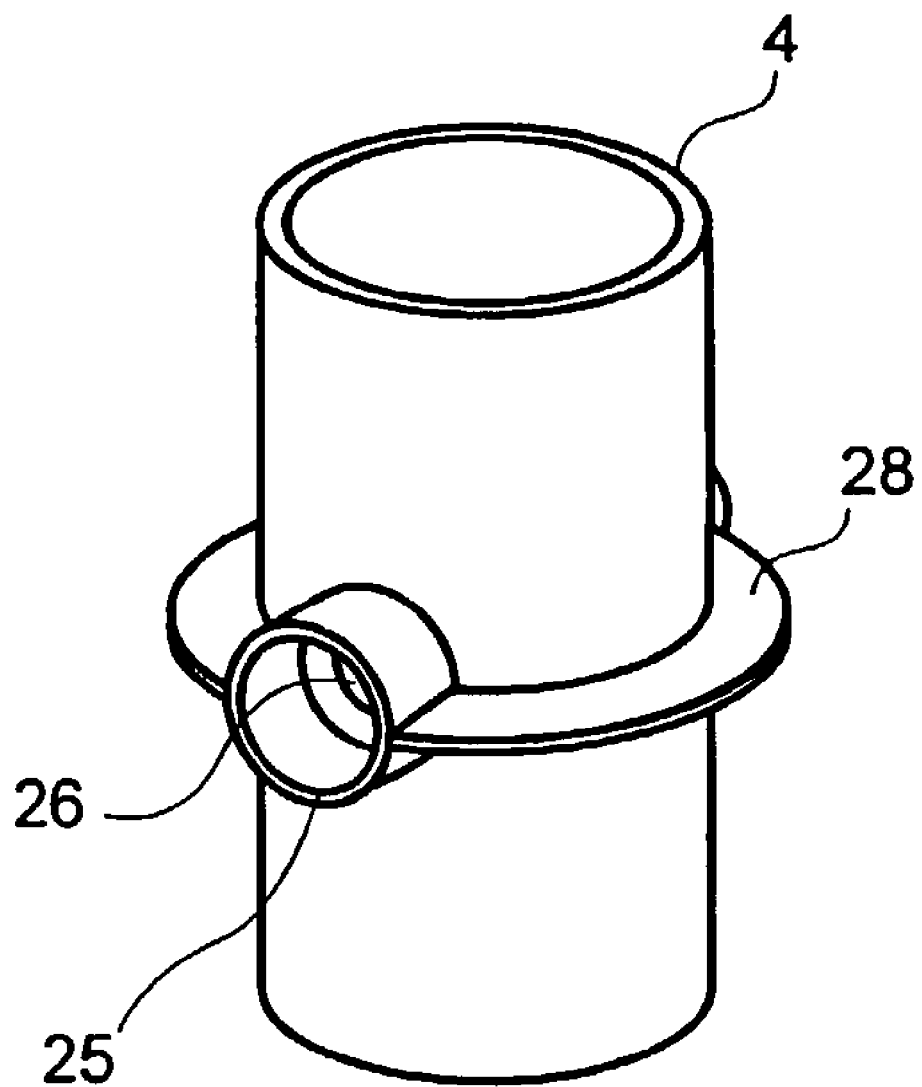
FIG. 15 is a fragmentary perspective view of a throttle body in a fourth embodiment according to the present invention.
Figure 16:
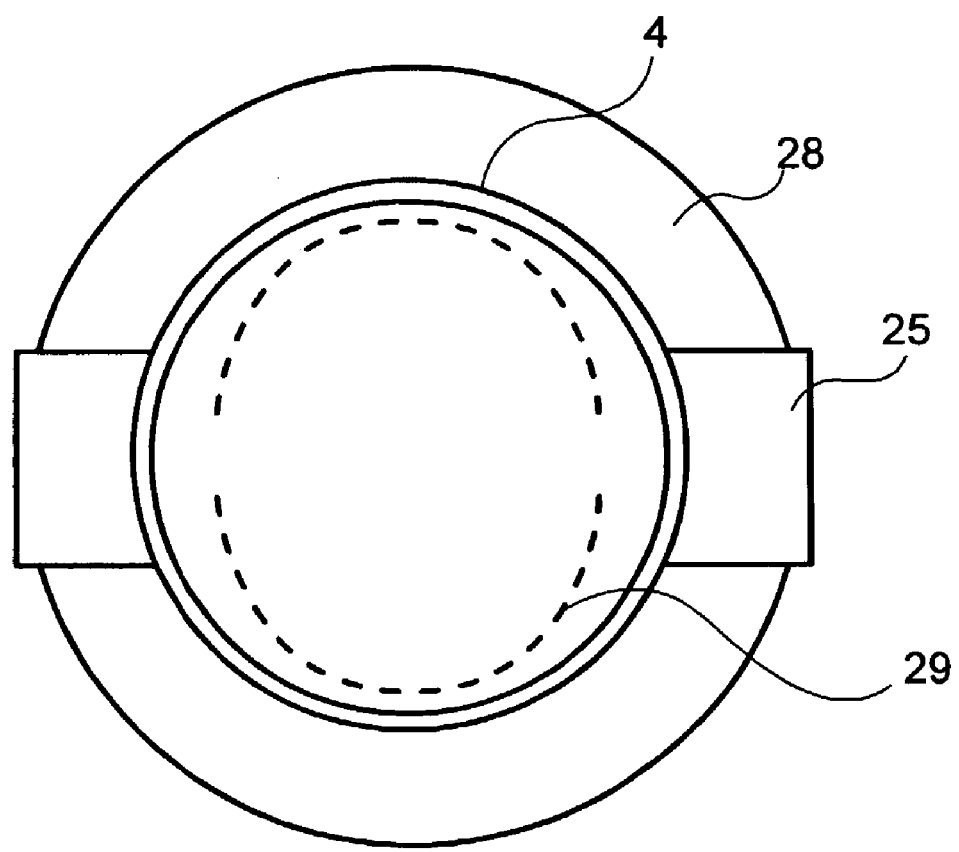
FIG. 16 is a top view of the throttle body shown in FIG. 15.

FIG. 14 shows the results of the analysis. Broken lines 27 indicate, in an enlarged view, the position of the bore corresponding to the position of the center of the throttle shaft after shrinkage. As obvious from FIG. 14, the shrinkage of the part corresponding to the bearing housings 25 is large and the bore 4 has a laterally elongate elliptic shape. To form this part in a shape having a satisfactory roundness, an annular rib 28 of 2 mm in thickness and 10 mm in width was formed around a part corresponding to the center of the throttle shaft. FIG. 16 shows the results of analysis performed using the model shown in FIG. 15. Broken lines 29 indicate, in an enlarged view, the position of the bore corresponding to the position of the center of the throttle shaft after shrinkage. As obvious from FIG. 16, the shrinkage of the bore is different from that of the bore shown in FIG. 14, and a part corresponding to the bearing housings and the bore has a longitudinally elongate elliptic shape. It was inferred that such shrinkage occurred because the shrinkage of the annular rib is greater than a part corresponding to the bearing housings.

Figure 17:
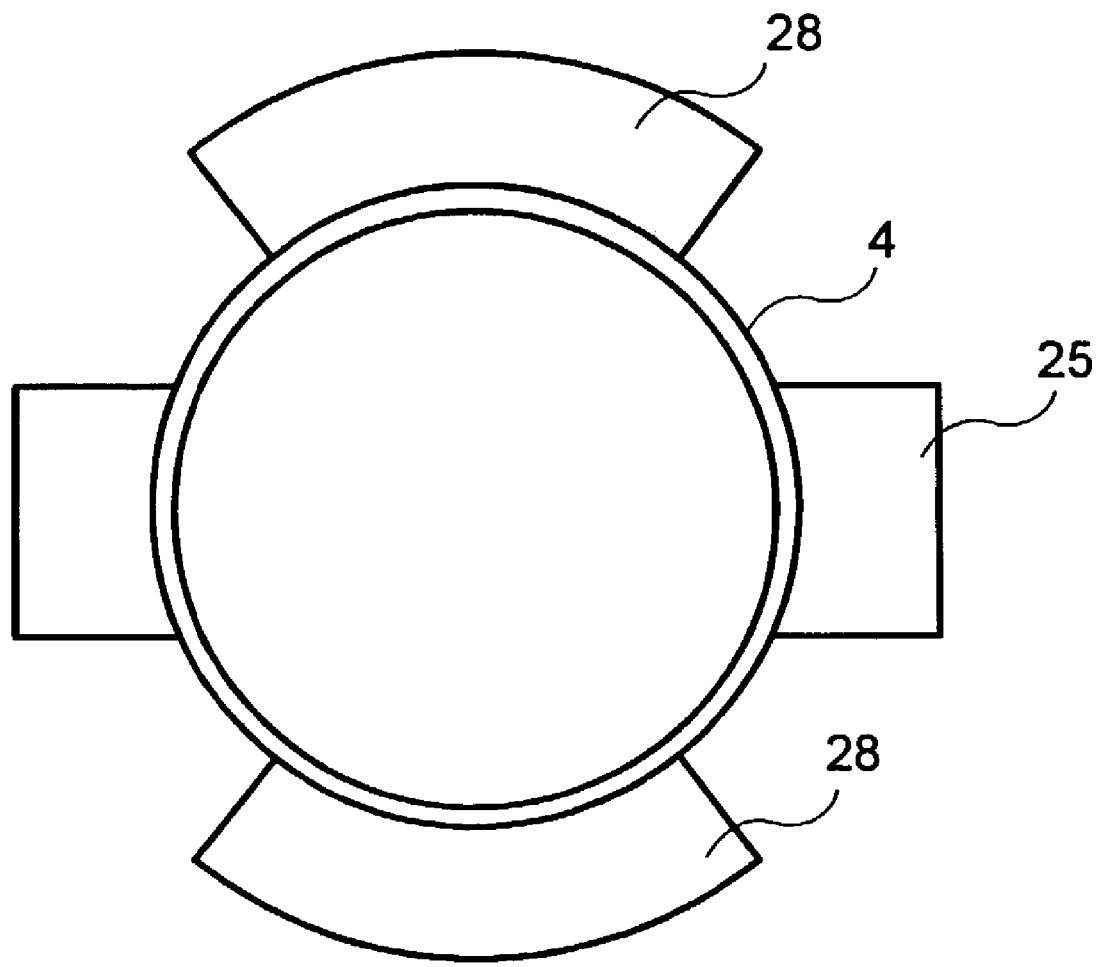
FIG. 17 is a fragmentary top view of the throttle body in the fourth embodiment.
Figure 18:
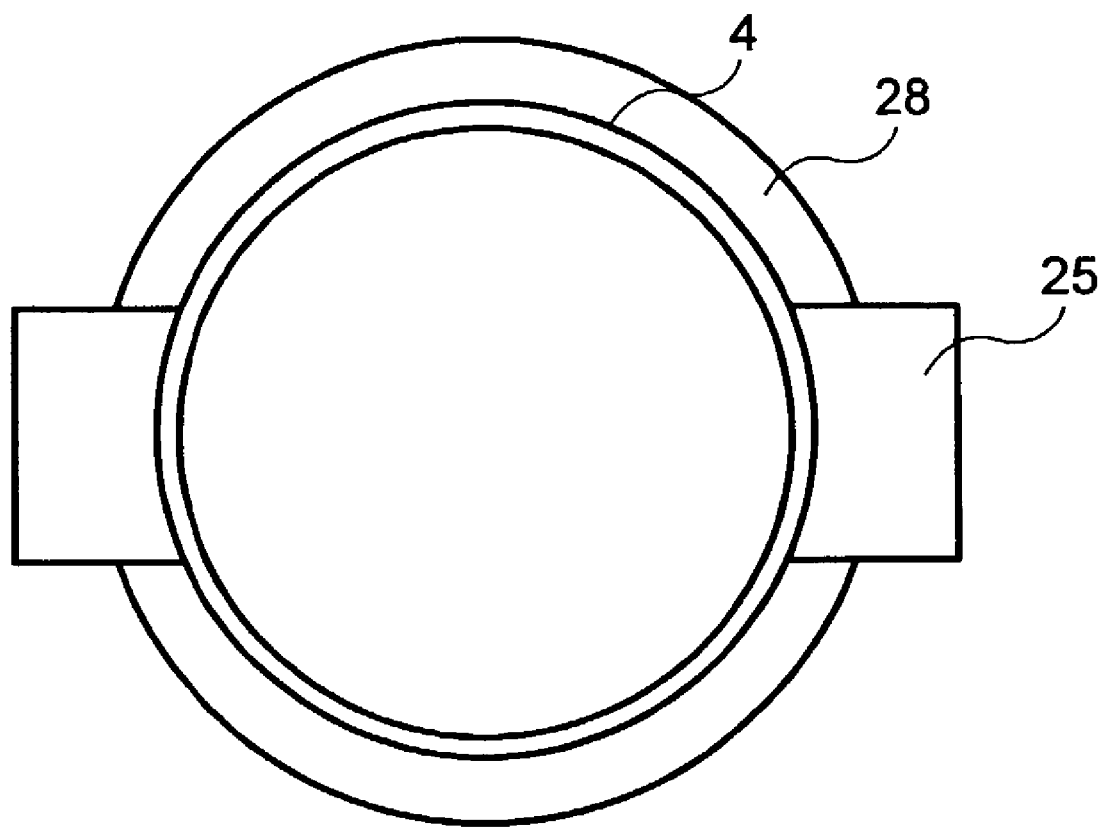
FIG. 18 is a fragmentary top view of the throttle body in the fourth embodiment.
Figure 19:
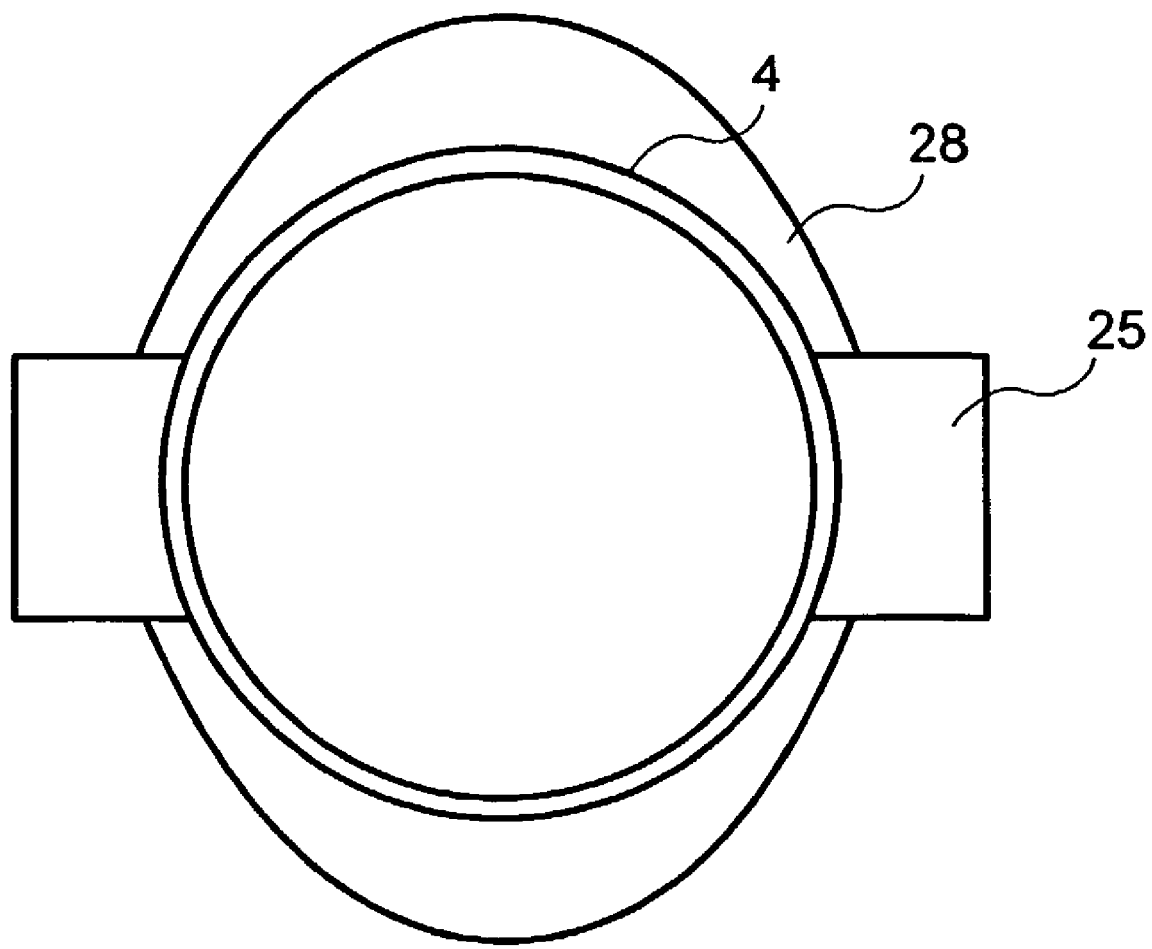
FIG. 19 is a fragmentary top view of the throttle body in the fourth embodiment.

It is known from the foregoing results that the roundness of the bore after shrinkage can be improved by properly determining the shape of the annular rib. FIG. 17 shows a bore provided with partial ribs. The partial ribs narrow the ranges of the shrinking effect of the ribs. FIG. 18 shows a rib having a narrow width. FIG. 19 shows ribs having a continuously changing width. The roundness of the bore can be greatly improved by these ribs.

Figure 20:
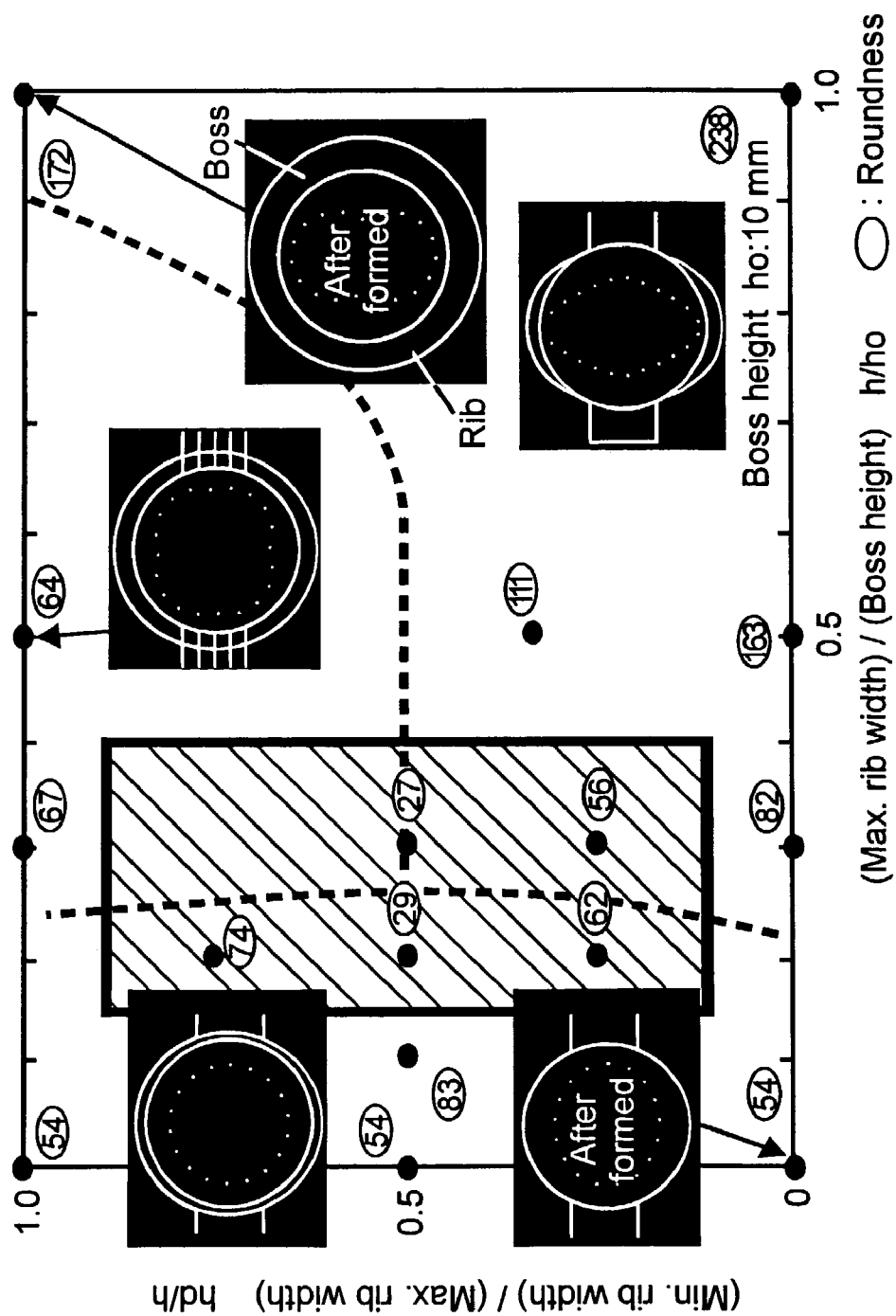
FIG. 20 is a view of to assist in explaining a deformation mode of the throttle body in the fourth embodiment.

FIG. 20 is a diagram to assist in explaining the dependence of deformation due to postmolding shrinkage on the shape of the rib, in which the ratio $h/h_0$, i.e., the ratio of the maximum width h of the rib to the height $h_0$ of the boss, is measured on the horizontal axis, and the ratio hb/h, i.e., the ratio of minimum width hb of the rib to the maximum width h of the rib, is measured on the vertical axis. The bore is deformed in a laterally elongate elliptic shape, in a longitudinally elongate elliptic shape, and in a nearly square shape when any ribs are not formed, when a large rib is formed, and when a rib having a comparatively narrow, uniform width is formed, respectively. The roundness after molding shrinkage is the smallest in the vicinity of the boundaries of those three deformation modes. The roundness is 80 μm or below in a range where the maximum width is in the range of 15 to 40% of the height of the boss, and the minimum width is in the range of 20 to 80% of the maximum width. In FIG. 20, the respective mean wall thicknesses of the rib and the bore are substantially equal. It is considered that sinks are dependent not only on the width of the rib and the height of the boss, but also on the volume. When the rib and the boss differ from each other in wall thickness, the deformation mode will be similar to the case where the width of the rib and the height of the boss are multiplied by the wall thickness. The same effect as that obtained when the rib and the boss have the same wall thickness is expected when the rib is formed such that the product of the maximum width and wall thickness of the rib is in the range of 15 to 40% of the product of the height and the mean wall thickness of the boss, and the product of the minimum width and wall thickness of the rib is in the range of 20 to 80% of the product of the maximum width and wall thickness of the rib.

Since the throttle valve is inclined at an angle in the range of 5° to 7° when closed, the roundness must be 80 µm or below in a range of ±5 mm along the center axis of the bore from a position corresponding to the throttle shaft. The results of the analysis showed that the roundness is substantially 80 µm or below in the aforesaid ranges. Although the rib is formed in one layer at a position corresponding to the center of the throttle shaft in this embodiment, ribs may be formed in two or more layers at positions around the center of the throttle shaft. Since the rib enhances the rigidity of the bore, the wall thickness of the bore may be reduced.

The results of the analysis showed that the roundness of a part corresponding to the throttle shaft is scarcely improved when the rib is formed in axial range other than an axial range corresponding to the boss. Therefore, the rib must be formed in the axial range corresponding to the boss. The concept of the shape of the rib in this embodiment applies also to a case where a resin and fiber content different from those in this embodiment are used.

Fifth Embodiment:

When an internal combustion engine, not shown, operates, exhaust gas and blowby gas sometimes flow from the internal combustion engine toward a throttle valve 1. These gases contain carbon and oils. If the gap between a throttle valve 1 and a bore wall 4a is narrow, the carbon and the oils adhere to and solidify on a peripheral part of throttle valve 1 facing bore wall 4a. Consequently, throttle valve 1 becomes unmovable.

The adhesion of oils or carbon can be prevented by forming throttle valve 1 of a resin which prevents the adhesion of oils, carbons or any adhesive substance containing oils and carbon. More specifically, water repellency can be increased and the adhesion of oils or carbon to the throttle valve can be prevented by adding a fluorocarbon resin, such as PTFE (polytetrafluoroethylene resin) to the resin. Formation of a peripheral part of throttle valve 1 of a resin containing a fluorocarbon resin by two-color molding provides a similar effect. Alternatively, coating the surface of throttle valve 1 with a fluorocarbon resin provides a comparable effect.

According to the present invention, bore 4 and throttle valve 1 are substantially the same in linear expansion coefficient, keeping the gap between bore wall 4a and circumference 1a of throttle valve 1 uniform, and avoiding the interference between bore 4 and throttle valve 1. Also according to the present invention, the roundness of the portion of the bore around the throttle shaft after molding shrinkage can be reduced.

Thus, the gap between bore wall 4a and circumference 1a of the throttle valve during idling can be limited to a very small value, so that a high-performance resin throttle body that permits only a small amount of air leakage can be obtained. Thus, according to the present invention, the adhesion of carbon and oils to throttle valve 1 can be suppressed by adding an additive to the resin and, consequently, faulty operation of throttle valve 1 can be prevented.

INDUSTRIAL APPLICABILITY

The present invention is applicable to the throttle body included in the intake system of an automobile, and is particularly of service when the bore and the throttle valve of the throttle body are made of resins.

What is claimed is:

1. A throttle body comprising:
a throttle shaft extended substantially diametrically across an intake cylinder bore; and
a throttle valve fixed to the throttle shaft and contained in the bore;
wherein the bore and the throttle valve are made of a resin containing filler;
a plurality of grooves are arranged in a zigzag arrangement like concentric circles on at least one surface of main surface and back surface of the throttle valve; and
the difference between circumferential deformation of the bore and radial deformation of the throttle valve is in the range of 0 µm to 40 µm at temperatures in the range of −40° C. to 120° C.

2. A throttle body comprising:
an intake cylinder bore; and
a throttle valve;
wherein the throttle valve and the bore are made of resins containing filler;
a plurality of grooves are arranged partly on concentric circles on at least one surface of main surface and back surface of the throttle valve; and
the difference between the linear expansion coefficient of the throttle valve and that of the bore is in the range of 0 to 4×10$^{-6}$/° C.

3. A throttle body comprising:
a throttle shaft extended substantially diametrically across an intake cylinder bore; and
a throttle valve fixed to the throttle shaft and contained in the bore;
wherein the bore and the throttle valve are made of a resin containing filler;
a plurality of grooves are arranged partly like concentric circles on one side and a plurality of ribs are arranged like concentric circles on the other side on at least one surface of main surface and back surface of the throttle valve;
and the filler is substantially circumferentially oriented in the throttle valve.

4. A throttle valve comprising:
a throttle shaft extended substantially diametrically across an intake cylinder bore; and
a throttle valve fixed to the throttle shaft and contained in the bore;
wherein the bore and the throttle valve are made of a resin containing filler; and
the throttle valve is made of a resin different in filler content from that forming the bore to make the radial linear expansion coefficient of the throttle valve nearly equal to the circumferential linear expansion coefficient of the bore.

5. The throttle body according to claim 4, wherein at least a peripheral part of the throttle valve facing the bore wall of the bore is made of a resin containing a fluorocarbon resin or is coated with a fluorocarbon resin.

* * * * *